United States Patent [19]
Funada et al.

[11] Patent Number: 4,610,510
[45] Date of Patent: Sep. 9, 1986

[54] LIQUID CRYSTAL DISPLAY CELL HAVING STEPPED SUBSTRATE ENDS AND METHOD FOR MANUFACTURE THEREOF

[75] Inventors: Fumiaki Funada, Yamatokoriyama; Hiroshi Kuwagaki, Jyoyo; Kunihiko Yamamoto, Nara; Masataka Matsuura, Tenri, all of Japan

[73] Assignee: Sharp Kabushiki Kaisha, Osaka, Japan

[21] Appl. No.: 618,450

[22] Filed: Jun. 7, 1984

[30] Foreign Application Priority Data

Jun. 13, 1983 [JP] Japan .................................. 58-106419
Jun. 14, 1983 [JP] Japan .................................. 58-107212

[51] Int. Cl.⁴ ................................................ G02F 1/13
[52] U.S. Cl. ...................................... 350/334; 350/343
[58] Field of Search ................................ 350/334, 343

[56] References Cited

U.S. PATENT DOCUMENTS

| | | | |
|---|---|---|---|
| 4,260,224 | 4/1981 | Takayama | 350/334 X |
| 4,362,903 | 12/1982 | Eichelberger et al. | 350/334 X |
| 4,443,063 | 4/1984 | Nishiyama | 350/343 X |
| 4,455,185 | 6/1984 | Sasaki et al. | 350/343 X |

*Primary Examiner*—John K. Corbin
*Assistant Examiner*—Richard F. Gallivan
*Attorney, Agent, or Firm*—Birch, Stewart, Kolasch & Birch

[57] ABSTRACT

A method for manufacturing a liquid crystal display cell comprises the steps of providing a first flexible substrate having a first end, providing a second flexible substrate which confronts the first flexible substrate and has an extended second end with respect to the first end of the first flexible substrate so as to form a stepped portion, depositing a sealing material at the stepped portion, depressing one method for the manufacture the first and second substrates against the other one, and cutting the first and second flexible substrates at 68 stepped portion.

12 Claims, 6 Drawing Figures

LIQUID CRYSTAL DISPLAY CELL HAVING STEPPED SUBSTRATE ENDS AND METHOD FOR MANUFACTURE THEREOF

BACKGROUND OF THE INVENTION

The present invention relates to a liquid crystal display cell comprising substrates of a flexible film and a method for manufacturing the cell, and, more particularly, to a liquid crystal display cell with a uniform thickness using an intermediate cell in which air bubbles and a sealing material are prevented from entering into the intermediate cell interior through an injection hole of the cell and a method for the manufacture thereof.

The application of liquid crystal display cells to pocket size devices has been steadily expanding and, as a consequence, the need for producing liquid crystal display cells having a reduced weight and thickness has been recognized. At present, liquid crystal display cells primarily use glass substrates, and since these glass substrates lose mechanical strength as the glass decreases in thickness, the manufacture of glass substrate display cells is difficult and the quality of the resultant display cells suffers. As the glass becomes thinner, it is more likely to break. Additionally, from an economic point of view, the price of the glass substrae increases as the wall thickness decreases. To eliminae these problems, a an organic polymer film capable of replacing glass can be used for the substrate. When the organic polymer film is used as the material for the substrates, the need to produce display cells of reduced weight and thickness is satisfied by display cells that will sustain external impacts, such as those caused by a fall, without breaking. Because the organic polymer film is flexible, it naturally follows that the display cells using substrates of this film are flexible. This type of film permits manufacture of display cells for curved surfaces or display cells having freely alterable surface properties which, at the same time, do not break when deformed. The substrates for the display cells must have a certain degree of transparency, thermal resistance, mechanical strength, and stiffness.

However the organic polymer film is used as the material for the substrates, it is difficult to fix the distance between the substrates or the distance separating the electrodes because the film is flexible. When the fabricated liquid crystal cell as described above is left standing for a long period of time or is placed under conditions of widely varying temperature changes, such as encountered in a temperature-humidity cycling test, the liquid crystal cell forms zones in which the two flexible film substrates come into mutual contact and thus short circuits are caused between the electrodes. On the other hand, even though the short circuits could be prevented by, for example, inserting spherical spacers about 10 $\mu$m in diameter between the electrodes, the variation in the distance separating the electrodes after the cycling tests, etc. is in the range of about 10 $\mu$m to about 100 $\mu$m within the same cell. As a consequence, the response time of the display cell varies greatly from one position to another across the surface of display cell and the quality of the display may be seriously reduced.

When the liquid crystal cell is manufactured, the excess liquid crystals may be removed from the cell after the injection of liquid crystals into the cell through an injection hole, by sequentially pressing both surfaces of the cell with rollers of a suitable elastic material in a direction from one side toward the other side, so that cell with a uniform thickness can be manufactured. However, when the injection hole is sealed, the back pressure generated by the following film substrates will cause air bubbles to enter the display cell interior through the injection hole of the cell or excess injection hole sealing material to enter the display cell interior. Therefore, the quality of the display cell may be seriously reduced.

SUMMARY OF THE INVENTION

It is an object of the present invention to provide a flexible liquid crystal display cell with a uniform thickness.

It is another object of the present invention to provide a flexible liquid crystal display cell with a high quality of the display It is still another object of the present invention to provide a flexible liquid crystal display cell using substrates of a flexible film make of an organic polymer.

It is a further object of the present invention to provide an intermediate liquid crystal display cell which can prevent air bubbles and a sealing material from entering into the intermediate display cell interior through an injection hole of the cell.

It is a further object of the present invention to provide a method for manufacturing a cell with a uniform thickness for preventing air bubbles and a sealing material from entering into the display cell interior through an injection hole of the cell.

Other objects and further scope of applicability of the present invention will become apparent from the detailed description given hereinafter. It should be understood, however, that the detailed description of and specific examples, while indicating preferred embodiments of the present invention are given by way of illustration only, since various changes and modifications within the spirit and scope of the present invention will become apparent to those skilled in the art from this detailed description.

According to one embodiment of the present invention, a method for manufacturing a liquid crystal display cell comprises the steps of providing a first flexible substrate having a first end, providing a second flexible substrate which confronts the first flexible substrates and has an extended second end with respect to the first end of the first flexible substrates so as to form a stepped portion, depositing a sealing material at the stepped portion, depressing one of the the first and second substrates against the other one, and cutting the first and second flexible substrates at the stepped portion.

The flexible first and second substrates are formed from an organic polymer film, and both include transparent electrodes and orienting films.

According to another embodiment of the present invention, an intermediate liquid crystal display cell comprises top and bottom substrates, a liquid crystal layer disposed between the top and bottom substrates, an injection hole provided at edges of the top and bottom substrates for injecting liquid crystals of the liquid crystal layer, the edges of the top and bottom substrates not coinciding with each other at the edge containing the injection hole so as to form a stepped portion, and a sealing agent deposited at the stepped portion for sealing the injection hole, wherein the edges of the substrates are cut to provide a final liquid crystal display cell.

The top and bottom substrates are formed from a flexible organic polymer film and include transparent electrodes. The intermediate liquid crystal display cell further comprises an orienting film formed on each of the top and bottom substrates, and spacers substantially uniformly distibuted between the top and bottom substrates.

BRIEF DESCRIPTION OF THE DRAWINGS

The present invention will be better understood from the detailed description given hereinbelow and the accompanying drawings which are given by way of illustration only, and thus are not limitative of the scope of the present invention and wherein.

DETAILED DESCRIPTION OF THE INVENTION

Figure 1:
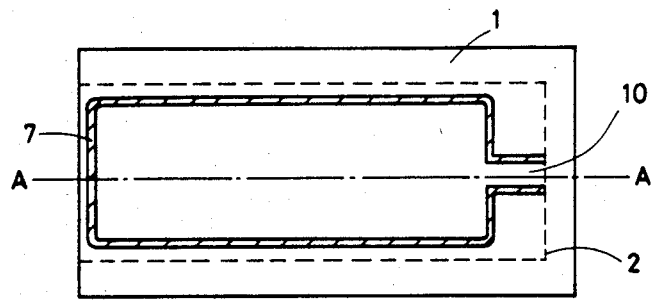
FIG. 1 is a plan view of an intermediate liquid crystal display cell comprising substrates made of an organic polymer film before injecting liquid crystals.

FIG. 1 illustrates an intermediate liquid crystal display cell, before injecting liquid crystals, using a film made from an organic polymer for its substrates according to one embodiment of the present invention.

Figure 2:
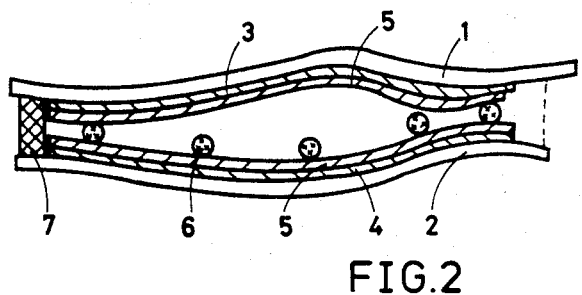
FIG. 2 is a cross-sectional view of the intermediate crystal display cell taken along line A—A of FIG. 1.

On the inner surfaces of organic polymer film substrates 1 and 2 opposed to each other, transparent electrodes 3 and 4 are formed by deposition of an indium tin oxide ($In_2O_3 + SnO_2$) film or the like. Superposed on the transparent electrodes 3 and 4 are orienting films 5 made of, for example, SiO, $SiO_2$, polymide, polyimideamide, or polyvinyl alcohol, for orienting liquid crystal molecules. The orienting films 5 can orient the liquid crystal molecules by, for example, being subjected to a rubbing treatment or to oblique vaccum deposition. Spacers 6 are uniformly disposed on one of the film substrates 1 and 2 with the orienting films 5. The spacers 6 can be spheres of resin (such as Microperal SP made by Sekisui Fine Chemical) having a prescribed diameter or glass fiber particles (such as Glass LC spacer made by Asahi Fiber Glass) having a prescribed diameter. A sealing agent 7 is disposed on the other of the film substrates 1 and 2 by a screen printing technique, and thereafter, the two film substrates 1 and 2 are joined face to face forming a small gap therebetween for a liquid crystal layer, and the sealing agent 7 is cured in a specific condition to circle the liquid crystal layer. The thus formed cell as shown in FIGS. 1 and 2 is filled with liquid crystals 8 through an injection hole 10 tightly sealed with a sealing material.

The injection hole 10 is formed so as to project from the area of the liquid crystal layer defined by the sealing agent 7.

The organic polymer material for the film substrates 1 and 2 is selected from, for example, polyesters (biaxially streched and monoaxially streched grades), polyethers, polysulfons, polycarbonates, and phenoxy ether polymers, or the like.

The introduction of the liquid crystals 8 into the interior of the cell through the injection hole 10 is accomplished by injecting the liquid crystals 8 using a vaccum injection technique. The injection hole 10 is formed on the side of the cell opposite the side completely closed by the sealing agent 7.

The vaccum injection technique includes the steps of first immersing the intermediate crystal display cell in a bath of liquid crystals under a vacuum and then returning the vacuum at atmospheric pressure, thereby forcing the liquid crystal to enter the interior of the cell due to the pressure difference between the atmospheric pressure exerted upon the bath of the liquid crystals and the vaccum in the intermediate liquid crystal cell.

Figure 3:
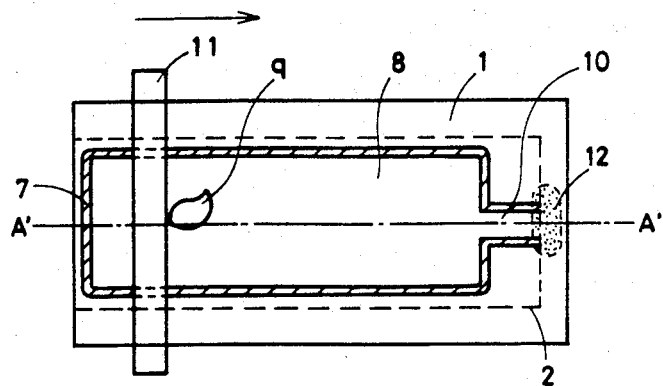
FIG. 3 is a plan view of a rolling operation applied to the cell after injecting the liquid crystals.

The display cell having the liquid crystals 8 injected therein, as described above, generally contains air bubbles 9 and excess liquid crystals in the cell interior, and may be formed with an interior thickness greater than the diameter of the spacers 6. In this condition, the produced intermediate liquid crystal display cell fails to provide a high quality display. The intermediate liquid crystal display cell in this condition needs to remove the air bubbles 9 and the excess liquid crystals from the interior of the cell and to be manufactured with an uniform thickness. The removal of the air bubbles 9 and the excess liquid crystals from the cell may be accomplished, after the injection of the liquid crystals 8, by sequentially pressing both surfaces of the cell with rollers 11 of a suitable elastic material in a direction toward the injection hole 10 from the side opposie the injection hole 10 (in the direction of an arrow shown in FIGS. 3 and 4). Since the rollers 11 used for this purpose are elastic, they can be moved on the film substrates 1 and 2 while keeping therselves close contact to the films, so as not to cause any damage. When the display cell is passed through the narrow space formed between the opposed rollers 11, the distance separating the film substrates 1 and 2, of the liquid crystal cell, is gradually decreased to a distance determined by the diameter of the spacers 6, and the excess liquid crystals are removed out of the injection hole 10. At the same time, the air bubbles 9 entrapped in the intermediae liquid crystl cell are removed out of the injection hole 10 as shown in FIG. 4.

The rollers 11 are made of an elastic material selected from among, for example, polyurethane rubber, silicone rubber, chloroprene rubber, and natural rubber. During this procedure, there is the possibility that the back pressure generated by the film substrates 1 and 2 will cause air bubbles 9 to re-enter the display cell interior through the injection hole 10 of the cell after the injection hole 10 has moved by having passed the rollers 11. To prevent this, the injection hole 10 may be somewhat closed with the sealing material 12 in an uncured stated before the cell is pressed by the rollers 11 or it may be coated with the sealing material 12 immediately before the rolling operation is completed. Consequently, the sealing material 12 is drawn into the liquid crystal path of the injection hole 10 to close the injection hole 10 against possible entry of air bubbles when the cell is removed from the rollers 11.

In the embodiment of the present invention, the rolling operation is carried out after the injection hole 10 is semi-cured or non-cured with the sealing material 12. Through the semi-cured or non-cured sealing material 12, the air bubbles and the excess liquid crystals are removed.

Figure 4:
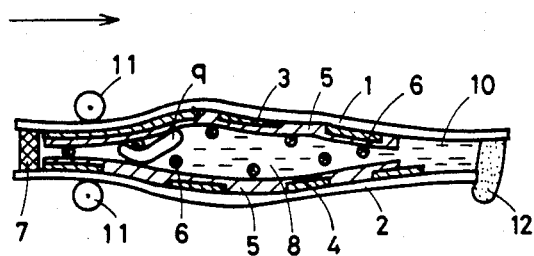
FIG. 4 is a cross-sectional view of the intermediate liquid crystal display cell taken along line A—A of FIG. 3.

The film substrates 1 and 2 differ in size as shown in FIGS. 1–6. Particularly, certain ends of the film substrates 1 and 2 formed with the injection hole 10 do not coincide with each other as shown in FIG. 4 and are formed as a stair (step). The length of the film substrate 1 as the upper substrate is longer than that of the film substrate 2 as a lower substrate, and the film substrate 1 is exended horizontally. Accordingly, the sealing material 12 is sufficiently applied and deposited on the stair (step) formed by both the end of the film substrate 2 and the overhanging surface of the film substrate 1, so that the sealing material 12 can be sufficiently carried and adhered on the circumference of the opening of the injection hole 10. The film substrates 1 and 2 may be the same in length if the ends of the film substrates 1 and 2 do not coincide with each other.

Since the thickness of each of the film substrates 1 and 2 is very thin, when the ends of the substrates 1 and 2 formed with the injection hole 10 do coincide with each other, it is difficult to sufficiently apply and deposit the sealing material 12 on the end surface formed by the ends of the film substrates 1 and 2, and the mix of the air bubbles into the cell interior is prevented.

If the ends of the film substrates 1 and 2 do not coincide with each other and are in the stair form, the area for carrying and adhering the sealing material 12 is increased and much sealing material 12 can be provided. material Even when the sealing material 12 is absorbed into the injection hole 10 by the back pressure generated by the film substrates 1 and 2 after the injection hole 10 has moved by having passed the rollers 11, the sealing material 12 remains at the opening of the injection hole 10, and the opening of the injection hole 10 is tightly closed by the sealing material 12 without the mix of the air bubbles.

Figure 5:
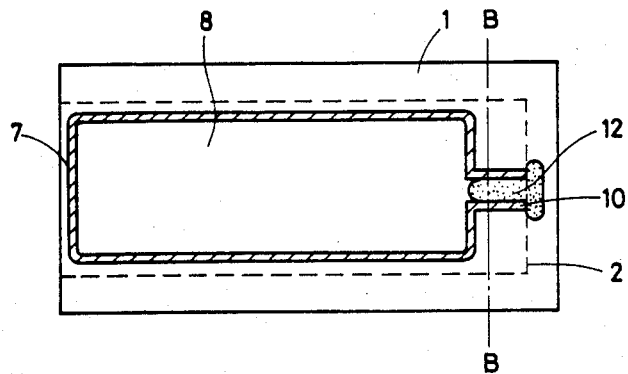
FIG. 5 is a plan view of the intermediate liquid crystal display cell after curing a sealing material in an uncured state sealed around an injection hole.
Figure 6:
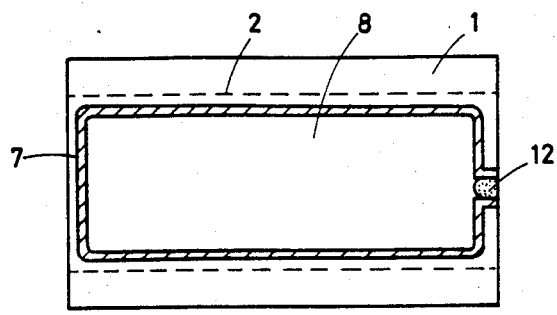
FIG. 6 is a plan view of a final liquid crystal display cell in complete form after the edges of the cell formed adjacent the injection hole are sheared along line B—B.

To prevent the intrusion of the sealing material 12 into the intermediate cell interior, the liquid crystal path of the projected injection hole 10 is sufficiently long enough, and at the same time, the roller pressure for pressing the film substrates 1 and 2 is controlled. FIG. 5 is a view of the liquid crystal display cell showing the injection hole 10 sealed by curing the sealing material 12.

As described above, the liquid crystals 8 are injected into the cell interior. Finally, the film substrates 1 and 2 at the circumference of the injection hole 10 having the stair form are sheared at a line B–B as shown in FIG. 5, and the unnecessary projected parts of the cell on the intermediate liquid crystal display cell formed with the injection hole 10 are removed.

Therefore, a compact and low-weight display cell, which is tightly sealed by the sealing material 12, can be provided without the stair-form.

The sealing material 12 used may be an optical curing sealing material, a room temperature curing material, or the like.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for manufacturing a liquid crystal display cell comprising the steps of:
   providing a first flexible substrate having a first end;
   providing a second flexible substrate which confronts said first flexible substrate and has an extended second end with respect to said first end of the said first flexible substrate so as to form a stepped portion;
   depositing a sealing material at said stepped portion;
   depressing one of the said first and second substrates against the other one; and
   cutting said first and second flexible substrates at said stepped portion.

2. The method of claim 1, wherein the flexible first and second substrates are formed from an organic polymer film.

3. The method of claim 1, wherein the flexible first and second substrates both include transparent electrodes.

4. The method of claim 1, wherein spacers are substantially and unformly distributed between the flexible first and second substrates.

5. The method of claim 1, wherein an orienting film is formed on each of the flexible first and second substrates.

6. An intermediate liquid crystal display cell comprising:
   top and bottom substrates;
   a liquid crystal layer disposed between the top and bottom substrates;
   an injection hole provided at edges of said top and bottom substrates for injecting liquid crystals;
   the edges of said top and bottom substrates not coinciding with each other at the edge containing the injection hole so as to form a stepped portion; and
   a sealing agent deposited at said stepped portion for sealing the injection hole, wherein the edges of the substrates are cut to provide a final liquid crystal display cell.

7. The intermediate liquid crystal cell of claim 6, wherein the top and bottom substrates are formed from a flexible organic film.

8. The intermediate liquid crystal cell of claim 6, wherein the top and bottom substrates are formed from an organic polymer film.

9. The intermediae liquid crystal display cell of claim 6, further comprising an orienting film formed on each of the top and bottom substrates.

10. The intermediate liquid crystal display cell of claim 6, further comprising spacers substantially uniformly distributed between the top and bottom substrates.

11. The intermediate liquid crystal display cell of claim 10, wherein the spacers are spheres.

12. The intermediate liquid crystal display cell of claim 6, wherein the top and bottom substrates both include transparent electrodes.

* * * * *